(12) United States Patent
Sundkvist

(10) Patent No.: US 6,406,676 B1
(45) Date of Patent: Jun. 18, 2002

(54) METHOD OF PURIFYING ACID LEACHING SOLUTION BY PRECIPITATION AND OXIDATION

(75) Inventor: Jan-Eric Sundkvist, Läkarvägen (SE)

(73) Assignee: Boliden Mineral AB (SE)

( * ) Notice: Subject to any disclaimer, the term of this patent is extended or adjusted under 35 U.S.C. 154(b) by 0 days.

(21) Appl. No.: 09/551,576

(22) Filed: Apr. 18, 2000

(30) Foreign Application Priority Data

Jun. 1, 1999 (SE) ............................................... 9902008

(51) Int. Cl.⁷ ..................... C22B 30/00; C22B 61/00; C22B 7/00
(52) U.S. Cl. ........................................... 423/140; 423/87
(58) Field of Search ......................... 423/87, 140, 531, 423/DIG. 1, DIG. 2, 141, 142; 210/724

(56) References Cited

U.S. PATENT DOCUMENTS

| 3,510,259 | A |   | 5/1970  | Everett et al. |        |
|-----------|---|---|---------|----------------|--------|
| 3,985,856 | A |   | 10/1976 | Johnson et al. |        |
| 4,241,039 | A |   | 12/1980 | Koh et al.     |        |
| 4,244,734 | A |   | 1/1981  | Reynolds et al.|        |
| 4,366,128 | A | * | 12/1982 | Weir et al. .............. | 423/87 |
| 4,452,706 | A | * | 6/1984  | Shaw et al. ............... | 210/722 |
| 5,427,691 | A | * | 6/1995  | Kuyucak et al. ............ | 210/713 |

FOREIGN PATENT DOCUMENTS

| AU | 92112011   |   | 9/1992  |          |         |
|----|-----------|---|---------|----------|---------|
| DE | 23 42 729 |   | 1/1975  |          |         |
| DE | 125 827   |   | 5/1977  |          |         |
| JP | 49-35516  | * | 9/1974  | ............ | 423/531 |
| JP | 53-3992   | * | 1/1978  | ............ | 423/531 |
| JP | 58-40191  | * | 3/1983  | ............ | 423/87  |
| JP | 59-052583 | * | 3/1984  |          |         |
| JP | 59-164639 | * | 9/1984  | ............ | 423/87  |
| JP | 04-318133 |   | 11/1992 |          |         |
| SU | 1 735 404 |   | 5/1992  |          |         |
| WO | 93/08310  | * | 4/1993  | ............ | 423/87  |
| WO | WO97/05292|   | 2/1997  |          |         |
| WO | WO97/16230|   | 5/1997  |          |         |

* cited by examiner

*Primary Examiner*—Steven Bos
(74) *Attorney, Agent, or Firm*—Burns, Doane, Swecker, & Mathis, L.L.P.

(57) ABSTRACT

A method of purifying an acid leaching solution obtained by processing hydrometallurgically material that contains valuable metals and also $Fe^{3+}$ and $Fe^{2+}$, and possibly also arsenic in solution. The major part of the $Fe^{3+}$-content and the arsenic is precipitated out in a first stage, by adding pH-elevating agent to the leaching solution. The precipitate formed in the first precipitation stage is extracted from the solution and removed from the process. The solution is oxidised in a second precipitation stage while adding a further pH-elevating agent for oxidation of $Fe^{2+}$ and precipitation of resultant $Fe^{3+}$ and any arsenic still present. The resultant precipitate and any residual solid pH-elevating agent are then extracted from the solution and returned in the process to more acid conditions, and the thus purified solution is then processed to win its valuable metal content in a manner per se. The pH is suitably raised during the first stage to a value in the range of 2.2–2.8, and in the second stage to a value in the range of 3.0–4.5. The oxidising process in the second stage is suitably effected by injecting air into the solution and by preferably using lime or limestone as the pH-elevating agent. Solid material extracted from the second stage is returned beneficially to the first stage. Some of the solid material taken from each precipitation stage can be recycled within respective stages as a nucleating agent.

12 Claims, 1 Drawing Sheet

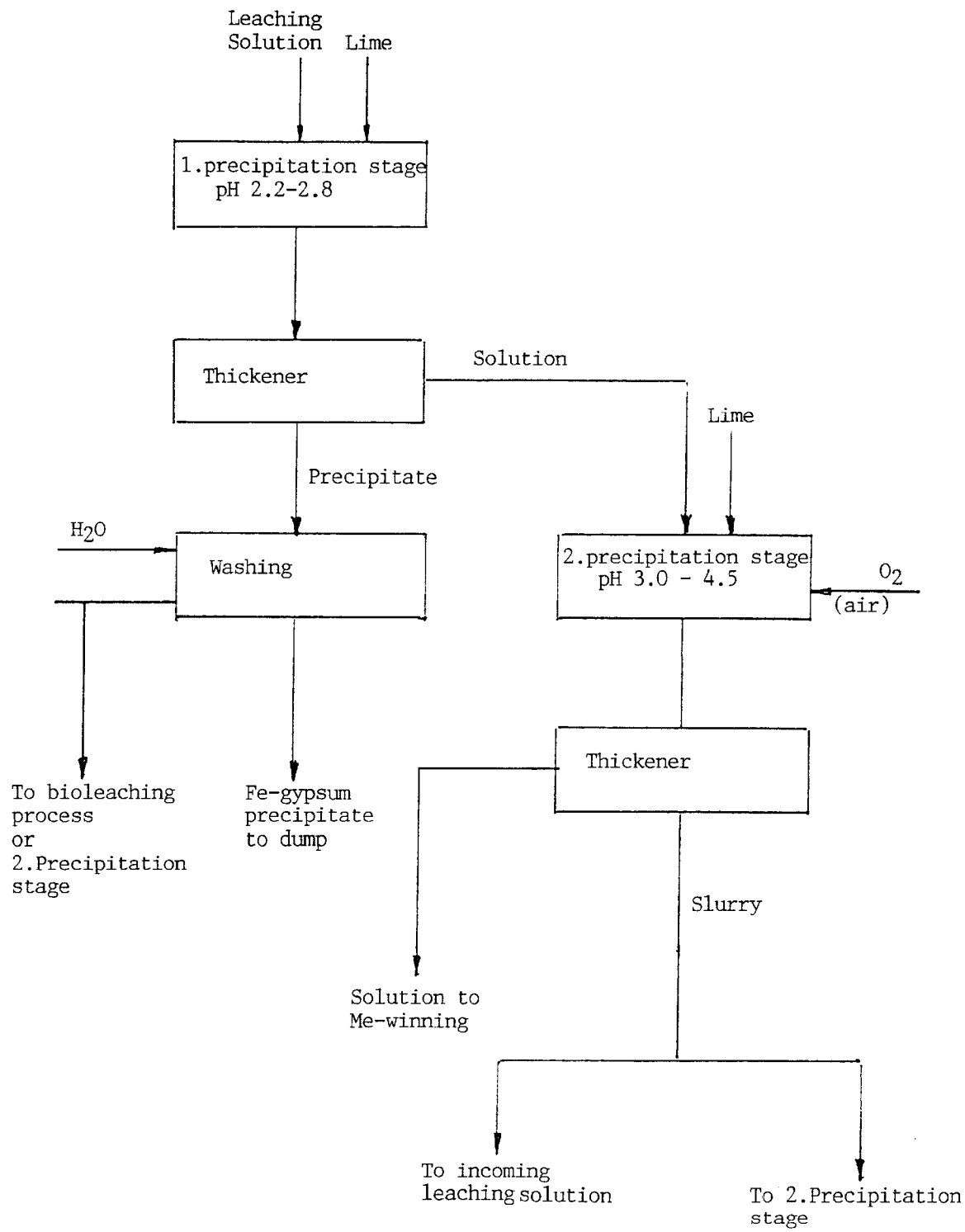

METHOD OF PURIFYING ACID LEACHING SOLUTION BY PRECIPITATION AND OXIDATION

BACKGROUND OF THE INVENTION

Field of the Invention

The present invention relates to a method of purifying an acid leaching solution which has been obtained by hydrometallurgically working-up material that contains valuable metals, and that in addition to said valuable metals also includes $Fe^{3+}$ and $Fe^{2+}$ and possibly also arsenic in solution. Although the method can be used generally for acid leaching solutions of this nature regardless of the choice of hydrometallurgical process applied and the type of starting material, it is particularly suitable for purifying acid leaching solutions that result from bioleaching processes, i.e. processes in which bacteria are used to accelerate the leaching process.

DESCRIPTION OF THE RELATED ART

Bioleaching is described generally in our earlier Patent Publications U.S. Pat. No. 5,397,380 and SE-A-9901613-1, and, for instance, also in WO 9216667 which deals generally with the oxidation of metal sulphide material with thermo-tolerant bacteria and also in WO 94/28184 which relates to bioleaching of zinc concentrate.

It is necessary to cleanse leaching solutions of the kind described in the introduction of their iron and possible arsenic content, in order to be able to win their valuable metal contents economically, for instance their copper, zinc, nickel, cobalt and precious metal contents by electrowinning or by some other suitable process. In the known methods applied to this end, such acid solutions, which often have a pH of about 1, are neutralised with lime or some like pH-elevating agent so as to precipitate the iron, wherewith any arsenic present will also be precipitated at the same time. Total precipitation of the iron (III) content is obtained at pH 3.0–3.5. One such known method is described in AU-A-11201/92, for instance.

A relatively large percentage of the iron in a bioleaching solution is present in divalent form, $Fe^{2+}$, and it is necessary to convert all iron to a trivalent form, i.e. $Fe^{3+}$, by oxidation in order to be able to separate the iron from remaining metals (valuable metals) by precipitation. This is normally effected at a pH>3 by injecting air into the system so as to obtain a sufficiently rapid kinetic, in other words a high oxidation rate. However, when precipitating iron at such high pH values some precipitation of other metals will take place, caused by inclusions in the resultant voluminous iron hydroxide precipitate among other things, and consequently valuable metals will be lost in the precipitate to an extent which is economically significant with respect to most valuable metals.

Proposals have been made as to how the loss of valuable metals caused by this co-precipitation can be avoided or at least reduced. There is described in an article by A. P. Brigos et al (Int. Biohydrometallurgy Symposium IBS97, Sydney, 1997) a bacteria leaching process undertaken in Uganda to recover cobalt from roasted pyrites, in which the iron was precipitated incompletely in order to avoid cobalt losses. This process, however, results in problems in the following cobalt recovery stage.

Another article by M. L. Steemson et al in the same publication (IBS97), there is described a bioleaching process for treating zinc concentrate, in which co-precipitation of zinc with the precipitation of iron is particularly upheld as a serious problem that necessitates re-dissolving the resultant iron precipitate and re-filtration in order to obtain a solution of the purity required for the subsequent zinc winning process using solvent extraction/electrowinning.

BRIEF DESCRIPTION OF THE DRAWING

The drawing is a flowchart illustrating one embodiment of the invention.

DETAILED DESCRIPTION OF THE INVENTION

The object of the present invention is to greatly reduce the extent of the problems associated with the co-precipitation of valuable metal contents when purifying the aforedescribed acid leaching solutions.

The inventive method is characterised to this end by the method steps set forth in the accompanying Claims. Thus, according to the present invention, the major part of the $Fe^{3+}$-content and arsenic content of the leaching solution is precipitated out in a first stage, by adding pH-elevating agent to the leaching solution. The precipitate formed in the first stage is separated from the solution and removed from the process. The precipitate-free solution is then oxidised in a second precipitation stage while adding additional pH-elevating agent to oxidise $Fe^{2+}$ and therewith precipitate out the resultant $Fe^{3+}$ and any arsenic that remains in the solution. The precipitate formed and any solid pH-elevating agent that remains is/are extracted from the solution and returned to the process to more acid conditions, and the thus purified, or cleansed, solution is then processed to recover its valuable metal content in a manner known per se. The pH is conveniently raised during the first process stage to a value lying in the range of 2.2–2.8, and is raised in the second process stage to a value lying in the range of 3.0–4.5. Oxidation in the second process stage is conveniently effected by injecting air into the solution. The pH-elevating agent may suitably be lime or limestone, although it will be understood that local conditions and possible access to other inexpensive and useful alkaline materials may be a deciding factor in this respect. All or part of the solid material extracted from the second process stage may conveniently be returned to the first process stage, therewith utilising the added alkaline material to a maximum. Part of the separated solid material obtained in each precipitation stage may be returned within respective stages as a nucleating agent. Thus, the only part of the precipitate obtained in the second process stage that is not returned to the first stage is the part which then circulates internally within said stage.

The invention will now be described in more detail with reference to the accompanying drawing, which has the form of a flowchart that illustrates a preferred embodiment of the method, A sulphuric acid leaching solution containing iron, arsenic and also valuable metals that shall be won from the solution in later process stages is delivered together with lime to a reactor equipped with agitating or stirring means, or to a series of such reactors, for carrying out the first precipitation stage, which is effected by increasing the pH of the solution to a final value of 2.2–2.8. During this stage of the process, the major part of the trivalent iron present in the solution is precipitated together with any arsenic present. As much as 90–95% of the trivalent iron content and a significant part of the arsenic can be precipitated without risk of any co-precipitation of other metals. The resultant slurry is de-slimed. in a thickener, optionally with the aid of flocculating additive. Because of the relatively low pH at which the precipitate obtained from the thickener was formed, the precipitate is dense, easily filtered and easily washed, and is washed with water and possibly also with an acid additive. A final iron-arsenic-gypsum precipitate free from valuable metal can be removed from the process and further filtered, including a number of washing stages or counterflow washing of the precipitate in a thickener or thickeners, and then transported to a waste dump. The washing liquid is suitably recovered and returned as leaching solution to the bioleaching stage. The overflow from the thickener downstream of the first precipitation stage will be relatively turbid if no flocculating agent has been added, since the overflow is led into the first reactor of a series of reactors in the second precipitation stage, together with lime or limestone.

The divalent iron present is oxidised in this second precipitation stage, by injecting air into the solution and raising its pH to a final value of about 3.0–4.5. As a result of this oxidation, practically all of the trivalent iron newly formed from the iron that remained after the first precipitation process is precipitated out together with any remaining arsenic. The precipitate obtained in the second precipitation stage is delivered to a thickener, suitably together with a flocculating agent, downstream of the last reactor in said second stage; the precipitate should really be referred to as a slurry in this stage of the process, because of its voluminous and fluffy physical consistency in a highly liquid environment. There is obtained from the thickener an iron-free and particle-free overflow of solution that contains valuable metals, which can be delivered to an appropriate metal winning process, for instance a liquid extraction process and following electrowinning process, without further treatment. The thickened slurry obtained in the second thickener and possibly containing co-precipitates of valuable metals. in hydroxide form, is returned and fed into the first reactor in the first precipitation stage together with the acid leaching solution, where the--conditions prevailing in the process are as acid as possible. All co-precipitates and any unreacted lime will be effectively dissolved in the more acid environment. As indicated, some of the thickened slurry obtained in the second thickener may be recycled to the second precipitation stage with the object of improving crystallisation in the precipitation process in this stage.

EXAMPLE

When purifying an acid leaching solution that had an initial pH of 1.5 and contained, inter alia, about 11.5 g/l iron and 4.8 g/l zinc in comparison trials using two-stage precipitation in accordance with the invention and conventional single-stage precipitation, it was established that the loss of Zn with the total precipitation of iron achieved by raising the pH to about 3 corresponded to about 35% of the total amount present. In the case of the two-stage precipitation process, it was surprisingly found that only negligible amounts of zinc were present in the precipitate, enabling the zinc loss to be set to 0 in practice.

The method according to the invention affords a number of advantages, some of which include minimum losses of valuable metals caused by co-precipitation (see the above example)

minimum consumption of flocculating agent maximum appropriation of added alkali total precipitation of iron and arsenic is possible (in the absence of co-precipitation of other metals)

iron/arsenic precipitates can be washed effectively by withdrawing the product from the circuit at low pH, and as a result of the low addition of flocculating agent.

What is claimed is:

1. A method of purifying an acid leaching solution obtained when working-up hydrometallurgically material that contains valuable metals, said solution also containing $Fe^{3+}$ and $Fe^{2+}$ and arsenic, said method comprising adding a pH-elevating agent to the leaching solution so as to raise the pH to a value within the range of 2.2 to 2.8 and to precipitate the majority of the $Fe^{3+}$ and the arsenic from said solution in a first precipitation stage; separating the precipitate formed in the first precipitation stage from the solution; adding a further pH-elevating agent to the solution in a further precipitation stage; oxidizing $Fe^{2+}$ to $Fe^{3+}$ and precipitating the resulting $Fe^{3+}$ in the further precipitation stage; separating the resultant precipitate and any residual solid pH-elevating agent from the solution in the further precipitation stage and returning at least part of said resultant precipitate and any residual solid pH-elevating agent to the leaching solution prior to the first precipitation stage; and thereafter winning the valuable metal content from the thus purified solution.

2. The method according to claim 1 wherein the pH is raised to a value within the range of 3.0–4.5 in the further precipitation stage.

3. The method according to claim 2 wherein oxidation is achieved in the further precipitation stage by injecting air into the solution.

4. The method according to claim 1 wherein oxidation is achieved in the further precipitation stage by injecting air into the solution.

5. The method according to claim 3 wherein lime or limestone is the pH-elevating agent.

6. The method according to claim 2 wherein lime or limestone is the pH-elevating agent.

7. The method according to claim 1 wherein lime or limestone is the pH-elevating agent.

8. The method according to claim 7 wherein some of the precipitate separated from each precipitation stage is returned to the same precipitation stage as a nucleating agent.

9. The method according to claim 5 wherein some of the precipitate separated from each precipitation stage is returned to the same precipitation stage as a nucleating agent.

10. The method according to claim 4 wherein some of the precipitate separated from each precipitation stage is returned to the same precipitation stage as a nucleating agent.

11. The method according to claim 2 wherein some of the precipitate separated from each precipitation stage is returned to the same precipitation stage as a nucleating agent.

12. The method according to claim 1 wherein some of the precipitate separated from each precipitation stage is returned to the same precipitation stage as a nucleating agent.

* * * * *